US012019671B2

(12) United States Patent
Zhao et al.

(10) Patent No.: US 12,019,671 B2
(45) Date of Patent: Jun. 25, 2024

(54) LOCALLY CONSTRAINED SELF-ATTENTIVE SEQUENTIAL RECOMMENDATION

(71) Applicant: Adobe Inc., San Jose, CA (US)

(72) Inventors: Handong Zhao, Cupertino, CA (US); Zhankui He, San Diego, CA (US); Zhaowen Wang, San Jose, CA (US); Ajinkya Gorakhnath Kale, San Jose, CA (US); Zhe Lin, Clyde Hill, WA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/501,191

(22) Filed: Oct. 14, 2021

(65) Prior Publication Data

US 2023/0116969 A1   Apr. 20, 2023

(51) Int. Cl.
*G06F 16/43* (2019.01)
*G06F 16/438* (2019.01)
*G06F 16/44* (2019.01)
*G06N 3/045* (2023.01)

(52) U.S. Cl.
CPC .......... *G06F 16/438* (2019.01); *G06F 16/447* (2019.01); *G06N 3/045* (2023.01)

(58) Field of Classification Search
CPC .............................. G06F 16/438; G06F 16/447
USPC ........................................................ 707/722
See application file for complete search history.

(56) References Cited

U.S. PATENT DOCUMENTS

| 2018/0352091 A1 | 12/2018 | Puri et al. |
| 2020/0356598 A1 | 11/2020 | Cao et al. |
| 2020/0357143 A1 | 11/2020 | Chiu et al. |
| 2021/0005195 A1 | 1/2021 | Tao et al. |
| 2022/0172040 A1 | 6/2022 | Kazi et al. |
| 2022/0198211 A1* | 6/2022 | Ferreira Moreno .. G06F 16/447 |
| 2022/0230061 A1* | 7/2022 | Singh ..................... G06N 3/045 |

(Continued)

FOREIGN PATENT DOCUMENTS

WO   2020041413 A1   2/2020

OTHER PUBLICATIONS

"CIKM Cup 2016 Track 2: Personalized E-Commerce Search Challenge", DIGINETICA, CodaLab [online][retrieved Oct. 18, 2021]. Retrieved from the Internet <https://competitions.codalab.org/competitions/11161>., Aug. 5, 2016, 3 pages.

(Continued)

*Primary Examiner* — Hosain T Alam
*Assistant Examiner* — Tracy M McGhee
(74) *Attorney, Agent, or Firm* — FIG. 1 Patents

(57) ABSTRACT

Digital content search techniques are described. In one example, the techniques are incorporated as part of a multi-head self-attention module of a transformer using machine learning. A localized self-attention module, for instance, is incorporated as part of the multi-head self-attention module that applies local constraints to the sequence. This is performable in a variety of ways. In a first instance, a model-based local encoder is used, examples of which include a fixed-depth recurrent neural network (RNN) and a convolutional network. In a second instance, a masking-based local encoder is used, examples of which include use of a fixed window, Gaussian initialization, and an adaptive predictor.

20 Claims, 8 Drawing Sheets

(56) References Cited

U.S. PATENT DOCUMENTS

2023/0133522 A1    5/2023  Zhao et al.

OTHER PUBLICATIONS

"Unsplash Dataset", Unsplash [online][retrieved Oct. 18, 2021]. Retrieved from the Internet <https://unsplash.com/data>., Aug. 2020, 4 pages.

Bhattacharya, Moumita et al., "Query as Context for Item-to-Item Recommendation", RecSys '20: Fourteenth ACM Conference on Recommender Systems [retrieved Dec. 10, 2021]. Retrieved from the Internet <https://doi.org/10.1145/3383313.3411480>., Sep. 22, 2020, 2 pages.

Bogina, Veronika et al., "Incorporating Dwell Time in Session-Based Recommendations with Recurrent Neural Networks", RecSys '17: Proceedings of the Eleventh ACM Conference on Recommender Systems [retrieved Sep. 16, 2021]. Retrieved from the Internet <http://ceur-ws.org/Vol-1922/paper11.pdf>., Aug. 2017, 3 Pages.

Chang, Yi et al., "Query Understanding for Search Engines", Springer International Publishing, New York City, ISBN 978-3-030-58334-7 [retrieved Dec. 10, 2021]. Retrieved from the Internet <https://doi.org/10.1007/978-3-030-58334-7>., Reference needs broken into parts, Dec. 2020, 228 pages.

Chen, Xusong et al., "BERT4SessRec: Content-Based Video Relevance Prediction with Bidirectional Encoder Representations from Transformer", MM '19: Proceedings of the 27th ACM International Conference on Multimedia [Sep. 17, 2021]. Retrieved from the Internet <https://doi.org/10.1145/3343031.3356051>., Oct. 2019, 5 pages.

Cho, Kyunghyun et al., "Learning Phrase Representations using RNN Encoder-Decoder for Statistical Machine Translation", Cornell University, arXiv Preprint, arXiv.org [retrieved Jan. 13, 2022]. Retrieved from the Internet <https://arxiv.org/pdf/1406.1078.pdf>., Jun. 3, 2014, 15 pages.

Cho, Kyunghyun et al., "On the Properties of Neural Machine Translation: Encoder-Decoder Approaches", Eighth Workshop on Syntax, Semantics and Structure in Statistical Translation (SSST-8) [retrieved Sep. 17, 2021]. Retrieved from the Internet <https://arxiv.org/pdf/1409.1259.pdf>., 2014, 9 Pages.

Dallmann, Alexander et al., "Improving Session Recommendation with Recurrent Neural Networks by Exploiting Dwell Time", Cornell University, arXiv Preprint, arXiv.org [retrieved Sep. 16, 2021]. Retrieved from the Internet <https://arxiv.org/pdf/1706.10231.pdf>., Jun. 2017, 6 Pages.

Dehghani, Mostafa et al., "Neural Ranking Models with Weak Supervision", SIGIR '17: Proceedings of the 40th International ACM SIGIR Conference on Research and Development in Information Retrieval [retrieved Sep. 16, 2021]. Retrieved from the Internet <https://doi.org/10.1145/3077136.3080832>., Aug. 7, 2017, 10 Pages.

Devlin, Jacob et al., "BERT: Pre-Training of Deep Bidirectional Transformers for Language Understanding", Cornell University, arXiv Preprint, arXiv.org [retrieved on Sep. 16, 2021]. Retrieved from the Internet <https://arxiv.org/pdf/1810.04805.pdf>., May 24, 2019, 16 pages.

Devooght, Robin et al., "Long and Short-Term Recommendations with Recurrent Neural Networks", UMAP '17: Proceedings of the 25th Conference on User Modeling, Adaptation and Personalization [retrieved Sep. 17, 2021]. Retrieved from the Internet <https://doi.org/10.1145/3079628.3079670>., Jul. 9, 2017, 9 Pages.

Donkers, Tim et al., "Sequential User-based Recurrent Neural Network Recommendations", RecSys '17: Proceedings of the Eleventh ACM Conference on Recommender Systems [retrieved Sep. 16, 2021]. Retrieved from the Internet <https://cseweb.ucsd.edu/classes/fa17/cse291-b/reading/p152-donkers.pdf>., Aug. 27, 2017, 9 Pages.

Guo, Maosheng et al., "Gaussian Transformer: A Lightweight Approach for Natural Language Inference", Proceedings of the AAAI Conference on Artificial Intelligence, vol. 33, No. 01 [retrieved Sep. 17, 2021]. Retrieved from the Internet <http://ir.hit.edu.cn/~msguo/AAAI-GuoM.1484.pdf>., Jul. 17, 2019, 8 Pages.

Guo, Qipeng et al., "Multi-Scale Self-Attention for Text Classification", Proceedings of the AAAI Conference on Artificial Intelligence, vol. 34 No. 05 [retrieved Sep. 17, 2021]. Retrieved from the Internet <https://arxiv.org/pdf/1912.00544.pdf>., Apr. 3, 2020, 8 Pages.

Harper, F M. et al., "The MovieLens Datasets: History and Context", ACM Transactions on Interactive Intelligent Systems (TiiS) 5, 4, Article 19 [retrieved Sep. 20, 2021]. Retrieved from the Internet <http://files.grouplens.org/papers/harper-tiis2015.pdf>., Dec. 2015, 20 pages.

Hashemi, Homa B. et al., "Query Intent Detection using Convolutional Neural Networks", 2016 International Conference on Web Search and Data Mining, Workshop on Query Understanding [retrieved Sep. 16, 2021]. Retrieved from the Internet <http://people.cs.pitt.edu/~hashemi/papers/QRUMS2016_HBHashemi.pdf>., Feb. 2016, 5 pages.

He, Kaiming et al., "Deep Residual Learning for Image Recognition", Proceedings of the IEEE conference on computer vision and pattern recognition, 2016 [retrieved Sep. 20, 2021], Retrieved from the Internet: <https://openaccess.thecvf.com/content_cvpr_2016/papers/He_Deep_Residual_Learning_CVPR_2016_paper.pdf>., Jun. 2016, 9 pages.

He, Ruining et al., "Fusing Similarity Models with Markov Chains for Sparse Sequential Recommendation", Cornell University, arXiv Preprint, arXiv.org [retrieved Sep. 16, 2021]. Retrieved from the Internet <https://arxiv.org/pdf/1609.09152.pdf>., Sep. 28, 2016, 10 pages.

He, Ruining et al., "VBPR: Visual Bayesian Personalized Ranking from Implicit Feedback", Cornell University, arXiv Preprint, arXiv.org [retrieved Sep. 16, 2021]. Retrieved from the Internet <https://arxiv.org/pdf/1510.01784.pdf>., Oct. 2015, 7 pages.

He, Xiangnan et al., "Neural Factorization Machines for Sparse Predictive Analytics", SIGIR '17: Proceedings of the 40th International ACM SIGIR Conference on Research and Development in Information Retrieval [retrieved Sep. 16, 2021]. Retrieved from the Internet <http://staff.ustc.edu.cn/~hexn/papers/sigir17-nfm.pdf>., Aug. 7, 2017, 10 pages.

Hidasi, Balazs et al., "Parallel Recurrent Neural Network Architectures for Feature-rich Session-based Recommendations", RecSys '16: Proceedings of the 10th ACM Conference on Recommender Systems [retrieved Apr. 19, 2021]. Retrieved from the Internet <http://www.hidasi.eu/content/p_rnn_recsys16.pdf>., Sep. 2016, 8 pages.

Hidasi, Balazs et al., "Session-based Recommendations with Recurrent Neural Networks", Cornell University, arXiv Preprint, arXiv.org [retrieved Sep. 16, 2021]. Retrieved from the Internet <https://arxiv.org/pdf/1511.06939.pdf>., Mar. 29, 2016, 10 pages.

Hidasi, Balázd et al., "Recurrent Neural Networks with Top-k Gains for Session-based Recommendations", CIKM '18: Proceedings of the 27th ACM International Conference on Information and Knowledge Management [retrieved Sep. 16, 2021]. Retrieved from the Internet <https://arxiv.org/pdf/1706.03847.pdf>., Aug. 28, 2018, 10 pages.

Hochreiter, Sepp et al., "Long Short-Term Memory", Neural Computation, vol. 9, No. 8 [retrieved Sep. 3, 2021]. Retrieved from the Internet <http://www.cs.cmu.edu/afs/cs/user/bhiksha/WWW/courses/deeplearning/Fall.2016/pdfs/Hochreiter97_lstm.pdf>., Nov. 15, 1997, 32 pages.

Huang, Jin et al., "Improving Sequential Recommendation with Knowledge-Enhanced Memory Networks", SIGIR '18: The 41st International ACM SIGIR Conference on Research & Development in Information Retrieval [retrieved Sep. 16, 2021]. Retrieved from the Internet <https://tongtianta.site/oss//paper_pdf/0224d4ea-ad22-11e9-a230-00163e08bb86.pdf>., Jun. 27, 2018, 10 Pages.

Huang, Xiaowen et al., "CSAN: Contextual Self-Attention Network for User Sequential Recommendation", MM '18: Proceedings of the 26th ACM international conference on Multimedia [retrieved Sep. 20, 2021]. Retrieved from the Internet <https://dl.acm.org/doi/pdf/10.1145/3240508.3240609>., Oct. 2018, 9 pages.

(56) References Cited

OTHER PUBLICATIONS

Kabbur, Santosh et al., "FISM: factored item similarity models for top-N recommender systems", KDD '13: Proceedings of the 19th ACM SIGKDD international conference on Knowledge discovery and data mining [retrieved Sep. 20, 2021]. Retrieved from the Internet <https://citeseerx.ist.psu.edu/viewdoc/download?doi=10.1.1.714.8026&rep=rep1&type=pdf>., Aug. 11, 2013, 9 Pages.

Kang, Wang-Cheng et al., "Self-Attentive Sequential Recommendation", 2018 IEEE International Conference on Data Mining (ICDM) [retrieved Sep. 16, 2021]. Retrieved from the Internet <http://cseweb.ucsd.edu/~jmcauley/pdfs/icdm18.pdf>., Nov. 2018, 10 pages.

Kingma, Diederik P. et al., "Adam: A Method for Stochastic Optimization", Cornell University, arXiv Preprint, arXiv.org [retrieved Sep. 16, 2021]. Retrieved from the Internet <https://arxiv.org/pdf/1412.6980.pdf>., Jan. 30, 2017, 15 pages.

Krichene, Walid et al., "On Sampled Metrics for Item Recommendation", KDD '20: Proceedings of the 26th ACM SIGKDD International Conference on Knowledge Discovery & Data Mining [retrieved Sep. 16, 2021]. Retrieved from the Internet <https://doi.org/10.1145/3394486.3403226>., Aug. 2020, 10 pages.

Lei Ba, Jimmy et al., "Layer Normalization", Cornell University arXiv Preprint, arXiv.org [retrieved Mar. 12, 2021]. Retrieved from the Internet <https://arxiv.org/pdf/1607.06450.pdf>., Jul. 21, 2016, 14 pages.

Li, Jiacheng et al., "Time Interval Aware Self-Attention for Sequential Recommendation", WSDM '20: Proceedings of the 13th International Conference on Web Search and Data Mining [retrieved Sep. 16, 2021]. Retrieved from the Internet <https://doi.org/10.1145/3336191.3371786>., Jan. 20, 2020, 9 Pages.

Li, Jian et al., "Multi-Head Attention with Disagreement Regularization", Cornell University arXiv Preprint, arXiv.org [retrieved Sep. 20, 2021]. Retrieved from the Internet <https://arxiv.org/pdf/1810.10183.pdf>., Oct. 2018, 6 Pages.

Li, Jing et al., "Neural Attentive Session-based Recommendation", CIKM '17: Proceedings of the 2017 ACM on Conference on Information and Knowledge Management [retrieved Sep. 20, 2021]. Retrieved from the Internet <https://arxiv.org/pdf/1711.04725.pdf>., Nov. 6, 2017, 10 Pages.

Li, Shihao et al., "MRIF: Multi-resolution Interest Fusion for Recommendation", SIGIR '20: Proceedings of the 43rd International ACM SIGIR Conference on Research and Development in Information Retrieval [retrieved Sep. 20, 2021]. Retrieved from the Internet <https://arxiv.org/pdf/2007.07084.pdf>., Jul. 25, 2020, 4 Pages.

Lin, Jing et al., "FISSA: Fusing Item Similarity Models with Self-Attention Networks for Sequential Recommendation", RecSys '20: Fourteenth ACM Conference on Recommender Systems [retrieved Sep. 16, 2021]. Retrieved from the Internet <http://csse.szu.edu.cn/staff/panwk/publications/Conference-RecSys-20-FISSA.pdf>., Sep. 22, 2020, 10 Pages.

Liu, Chang et al., "Non-invasive Self-attention for Side Information Fusion in Sequential Recommendation", Cornell University, arXiv Preprint, arXiv.org [retrieved Sep. 16, 2021]. Retrieved from the Internet <https://arxiv.org/pdf/2103.03578.pdf>., Mar. 2021, 8 Pages.

Liu, Qiang et al., "Context-Aware Sequential Recommendation", IEEE International Conference on Data Mining (ICDM) [retrieved Sep. 16, 2021]. Retrieved from the Internet <https://arxiv.org/pdf/1609.05787.pdf>., Dec. 2016, 6 Pages.

Ma, Chen et al., "Hierarchical Gating Networks for Sequential Recommendation", KDD '19: Proceedings of the 25th ACM SIGKDD International Conference on Knowledge Discovery & Data Mining [retrieved Sep. 17, 2021]. Retrieved from the Internet <https://arxiv.org/pdf/1906.09217v1.pdf>., Jul. 25, 2019, 9 Pages.

Mcauley, Julian et al., "Image-based Recommendations on Styles and Substitutes", SIGIR '15: Proceedings of the 38th International ACM SIGIR Conference on Research and Development in Information Retrieval [retrieved Sep. 20, 2021]. Retrieved from the Internet, <http://citeseerx.ist.psu.edu/viewdoc/download?doi=10.1.1.700.743&rep=rep1&type=pdf>., Aug. 2015, 10 pages.

Meng, Wenjing et al., "Incorporating User Micro-behaviors and Item Knowledge into Multi-task Learning for Session-based Recommendation", SIGIR '20: Proceedings of the 43rd International ACM SIGIR Conference on Research and Development in Information Retrieval [retrieved Sep. 16, 2021]. Retrieved from the Internet <https://arxiv.org/pdf/2006.06922.pdf>., Jun. 12, 2020, 10 Pages.

Mikolov, Tomas et al., "Distributed Representations of Words and Phrases and their Compositionality", NIPS'13: Proceedings of the 26th International Conference on Neural Information Processing Systems vol. 2 [retrieved Sep. 17, 2021]. Retrieved from the Internet <https://proceedings.neurips.cc/paper/2013/file/9aa42b31882ec039965f3c4923ce901b-Paper.pdf>., Oct. 2013, 9 pages.

Nalisnick, Eric et al., "Improving Document Ranking with Dual Word Embeddings", Proceedings of the 25th International Conference Companion on World Wide Web [retrieved Sep. 17, 2021]. Retrieved from the Internet <http://cs.unibo.it/~montesi/CBD/Articoli/2016_Improving%20Document%20Ranking%20with%20Dual%20Word%20Embeddings.pdf>., Apr. 11, 2016, 2 Pages.

Ni, Jianmo et al., "Justifying Recommendations using Distantly-Labeled Reviews and Fine-Grained Aspects", Proceedings of the 2019 Conference on EMNLP-IJCNLP [retrieved Sep. 17, 2021]. Retrieved from the Internet <https://aclanthology.org/D19-1018.pdf>., Nov. 2019, 10 Pages.

Park, Dae Hoon et al., "A Neural Language Model for Query Auto-Completion", International ACM SIGIR Conference on Research and Development in Information Retrieval [retrieved Sep. 17, 2021]. Retrieved from the Internet <https://www.researchgate.net/publication/317379370_A_Neural_Language_Model_for_Query_Auto-Completion>., Aug. 7, 2017, 5 Pages.

Pennington, Jeffrey et al., "GloVe: Global Vectors for Word Representation", Proceedings of the 2014 Conference on Empirical Methods in Natural Language Processing (EMNLP) [retrieved on Sep. 17, 2021], Retrieved from the Internet: <https://www.aclweb.org/anthology/D14-1162.pdf>., Sep. 2014, 12 pages.

Rendle, Steffen et al., "BPR: Bayesian Personalized Ranking from Implicit Feedback", Cornell University arXiv Preprint, arXiv.org [retrieved Sep. 17, 2021]. Retrieved from the Internet <https://arxiv.org/ftp/arxiv/papers/1205/1205.2618.pdf>., May 9, 2012, 10 pages.

Rendle, Steffen , "Factorization Machines", 2010 IEEE International Conference on Data Mining [retrieved Sep. 17, 2021]. Retrieved from the Internet <https://www.csie.ntu.edu.tw/~b97053/paper/Rendle2010FM.pdf>., Dec. 2010, 6 pages.

Rendle, Steffen et al., "Factorizing Personalized Markov Chains for Next-Basket Recommendation", WWW'10: Proceedings of the 19th international conference on World wide web [retrieved Sep. 17, 2021]. Retrieved from the Internet <http://www.ra.ethz.ch/cdstore/www2010/www/p811.pdf>., Apr. 2010, 10 pages.

Shi, Yangyang et al., "Deep LSTM based Feature Mapping for Query Classification", Proceedings of the 2016 Conference of the North American Chapter of the Association for Computational Linguistics: Human Language Technologies [retrieved Sep. 17, 2021]. Retrieved from the Internet <https://aclanthology.org/N16-1176.pdf>., Jun. 2016, 11 Pages.

Shi, Yue et al., "CARS2: Learning Context-aware Representations for Context-aware Recommendations", CIKM '14: Proceedings of the 23rd ACM International Conference on Conference on Information and Knowledge Management [retrieved Sep. 17, 2021]. Retrieved from the Internet <https://alexiskz.files.wordpress.com/2016/06/km1212-karatzoglou.pdf>., Nov. 3, 2014, 10 Pages.

Shi, Yue et al., "TFMAP: optimizing MAP for top-n context-aware recommendation", SIGIR '12: Proceedings of the 35th international ACM SIGIR conference on Research and development in information retrieval [retrieved Sep. 17, 2021]. Retrieved from the Internet <http://www.cse.cuhk.edu.hk/irwin.king/_media/presentations/tfmapshi.pdf>., Aug. 12, 2012, 10 Pages.

Song, Younghun et al., "Augmenting Recurrent Neural Networks with High-Order User-Contextual Preference for Session-Based Recommendation", Cornell University arXiv Preprint, arXiv.org [retrieved Sep. 17, 2021]. Retrieved from the Internet <https://arxiv.org/pdf/1805.02983.pdf>., May 2018, 5 Pages.

Sun, Fei et al., "BERT4Rec: Sequential Recommendation with Bidirectional Encoder Representations from Transformer", Cornell

(56) References Cited

OTHER PUBLICATIONS

University, arXiv Preprint, arXiv.org [retrieved Sep. 16, 2021]. Retrieved from the Internet <https://arxiv.org/pdf/1904.06690.pdf>., Aug. 21, 2019, 11 pages.

Tang, Jiaxi et al., "Personalized Top-N Sequential Recommendation via Convolutional Sequence Embedding", WSDM '18: Proceedings of the Eleventh ACM International Conference on Web Search and Data Mining [retrieved Sep. 16, 2021]. Retrieved from the Internet <https://doi.org/10.1145/3159652.3159656>., Feb. 2018, 9 pages.

Vaswani, Ashish et al., "Attention Is All You Need", Cornell University arXiv Preprint, arXiv.org [retrieved Sep. 17, 2021]. Retrieved from the Internet <https://arxiv.org/pdf/1706.03762.pdf>., Dec. 6, 2017, 15 pages.

Wu, Liwei et al., "SSE-PT: Sequential Recommendation Via Personalized Transformer", RecSys '20: Fourteenth ACM Conference on Recommender Systems [retrieved Sep. 17, 2021]. Retrieved from the Internet <https://dl.acm.org/doi/pdf/10.1145/3383313.3412258>., Sep. 2020, 10 pages.

Wu, Liwei et al., "Stochastic Shared Embeddings: Data-driven Regularization of Embedding Layers", Cornell University arXiv Preprint, arXiv.org [retrieved Sep. 17, 2021]. Retrieved from the Internet <https://arxiv.org/pdf/1905.10630.pdf>., May 25, 2019, 15 pages.

Xiong, Chenyan et al., "End-to-End Neural Ad-hoc Ranking with Kernel Pooling", SIGIR '17: Proceedings of the 40th International ACM SIGIR Conference on Research and Development in Information Retrieval [retrieved Sep. 17, 2021]. Retrieved from the Internet <http://www.cs.cmu.edu/~callan/Projects/P2P/Papers/sigir17-Chenyan-Xiong-a.pdf>., Aug. 7, 2017, 10 Pages.

Yang, Baosong et al., "Modeling Localness for Self-Attention Networks", Cornell University arXiv Preprint, arXiv.org [retrieved Sep. 20, 2021]. Retrieved from the Internet <https://arxiv.org/pdf/1810.10182.pdf>., Oct. 2018, 10 Pages.

Yuan, Fajie et al., "A Simple Convolutional Generative Network for Next Item Recommendation", WSDM '19: Proceedings of the Twelfth ACM International Conference on Web Search and Data Mining [retrieved Sep. 20, 2021]. Retrieved from the Internet <https://core.ac.uk/download/pdf/337605672.pdf>., Jan. 30, 2019, 10 Pages.

Yun, Chulhee et al., "Are Transformers universal approximators of sequence-to-sequence functions?", Cornell University arXiv Preprint, arXiv.org [retrieved Sep. 20, 2021]. Retrieved from the Internet <https://arxiv.org/pdf/1912.10077.pdf>., Dec. 2019, 23 Pages.

Zamani, Hamed et al., "Relevance-based Word Embedding", SIGIR '17: Proceedings of the 40th International ACM SIGIR Conference on Research and Development in Information Retrieval [retrieved Sep. 17, 2021]. Retrieved from the Internet <https://arxiv.org/pdf/1705.03556.pdf>., Aug. 7, 2017, 10 Pages.

Zhang, Tingting et al., "Feature-level Deeper Self-Attention Network for Sequential Recommendation", Proceedings of the Twenty-Eighth International Joint Conference on Artificial Intelligence (IJCAI-19) [retrieved Apr. 27, 2021]. Retrieved from the Internet <https://www.ijcai.org/Proceedings/2019/0600.pdf>., Aug. 2019, 7 pages.

U.S. Appl. No. 17/513,127 , "Restriction Requirement", U.S. Appl. No. 17/513,127, Mar. 31, 2023, 5 pages.

U.S. Appl. No. 17/513,127 , "Final Office Action", U.S. Appl. No. 17/513,127, Oct. 13, 2023, 21 pages.

U.S. Appl. No. 17/513,127 , "Non-Final Office Action", U.S. Appl. No. 17/513,127, Aug. 4, 2023, 18 pages.

U.S. Appl. No. 17/513,127 , "Supplemental Non-Final Office Action", U.S. Appl. No. 17/513,127, Sep. 26, 2023, 18 pages.

U.S. Appl. No. 17/513,127 , "Non-Final Office Action", U.S. Appl. No. 17/513,127, Jan. 24, 2024, 26 pages.

\* cited by examiner

LOCALLY CONSTRAINED SELF-ATTENTIVE SEQUENTIAL RECOMMENDATION

BACKGROUND

Search is one of the primary mechanisms supported by computing devices to locate digital content such as digital images, digital movies, digital books, digital documents, applications, settings, and so forth. The general goal of a search is to identify an underlying intent of a search query and locate digital content corresponding to that intent. Intent is typically expressed in a search query using text. However, use of text is challenging especially for non-textual digital content, such as digital images. In these situations, conventional text-based techniques are tasked with matching an intent of an originator of a search query expressed via text with text used to tag the digital content, which is prone to error.

One technique that has been developed to aid in identifying intent of an entity regarding a search query involves leveraging sequences of interaction involving past search queries to identify a likely intent of current and future search queries. However, conventional self-attentive (transformer-based) techniques to leverage sequences are not configured for use in search and because of this lack accuracy and thus fail for their intended purpose when employed as part of a search technique. This results in inefficient use of computation resources used to support digital content searches due to repeated searches used to obtain a desired result.

SUMMARY

Digital content search techniques are described that overcome the challenges found in conventional self-attentive (transformer-based) sequence-based techniques through use of local constraints. In one example, a localized self-attention module is incorporated as part of a multi-head self-attention module that applies local constraints to the sequence. This is performable in a variety of ways. In a first instance, a model-based local encoder is used, examples of which include a fixed-depth recurrent neural network (RNN) and a convolutional network. In a second instance, a masking-based local encoder is used, examples of which include use of a fixed window, Gaussian initialization, and an adaptive predictor. In this way, the localized-self attention module expands functionality made available from a multi-head self-attention module to improve accuracy and computational performance of computing devices that implement these techniques.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
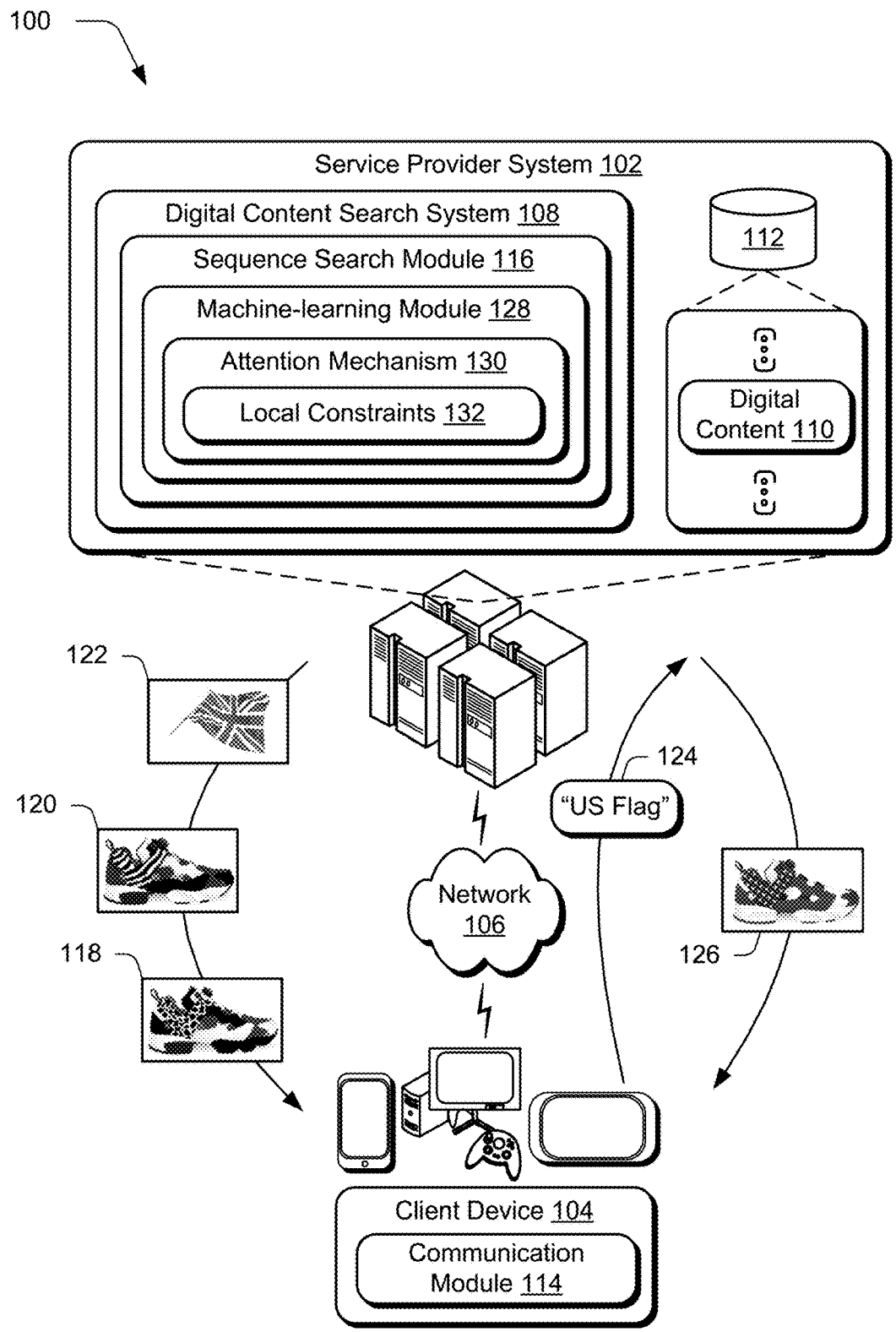
FIG. 1 is an illustration of an environment in an example implementation that is operable to employ digital content search techniques described herein.

Search is one of the primary mechanisms supported by computing devices to locate digital content such as digital images, digital movies, digital books, digital documents, applications, settings, and so forth. In order to aid in identifying intent of an entity regarding a search query, techniques have been developed to leverage sequences involving past search queries to identify a likely intent of current and future search queries.

One example of this is through use of attention and self-attentive models. Self-attention is an attention mechanism relating different positions within a sequence to itself. This is performed to compute a representation of that sequence that provides focus to portions that are likely relevant in determining an outcome. Self-attention has been found in real world scenarios to work well for tasks such as natural language processing because this technique draws from the state of any previous point in the sequence to explain a relationship between words in the sequence. However, in other real world scenarios such as search, self-attention has been found in experimental results to fail and provide inaccurate results when handling long sequences. This has been identified as described herein due to an inability of conventional attention-based techniques to distinguish between short-term and long-term interactions.

Accordingly, digital content search techniques are described that overcome the challenges found in conventional sequence-based techniques through use of local constraints that take temporal considerations into account. This is performed, for instance, to give a greater weighting to interactions in a sequence based on recency of those interactions. In this way, the techniques described herein address a likelihood that recent interactions in a sequence have a greater likelihood of reflecting intent behind a current search query than interactions occurring further in the past.

In one example, the techniques are incorporated as part of a multi-head self-attention module of a transformer using machine learning. In a multi-head self-attention module, each attention head is used to compute attention scores that are then combined together to produce a final attention score. Conventional attention heads, however, compute the attention scores globally in that a temporal order of the items in the sequence is not taken into account. As described above, this has been found to work well for tasks such as natural language processing but fails in search.

Accordingly, in this example a localized self-attention module is incorporated as part of the multi-head self-attention module that applies local constraints to the sequence. This is performable in a variety of ways. In a first instance, a model-based local encoder is used, examples of which include a fixed-depth recurrent neural network (RNN) and a convolutional network. In a second instance, a masking-based local encoder is used, examples of which include use of a fixed window, Gaussian initialization, and an adaptive predictor. In this way, the localized-self attention module expands functionality made available from a multi-head self-attention module to improve accuracy and computational performance of computing devices that implement these techniques. Further discussion of these and other examples is included in the following sections and shown using corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ digital content search techniques described herein. The illustrated environment 100 includes a service provider system 102 and a client device 104 that are communicatively coupled, one to another, via a network 106. The service provider system 102 and client device 104 are implemented via respective computing devices, which are configurable in a variety of ways.

A computing device, for instance, is configurable as a desktop computer, a laptop computer, a mobile device (e.g., assuming a handheld configuration such as a tablet or mobile phone), and so forth. Thus, computing devices range from full resource devices with substantial memory and processor resources (e.g., personal computers, game consoles) to a low-resource devices with limited memory and/or processing resources (e.g., mobile devices). Additionally, a computing device is also representative of a plurality of different devices, such as multiple servers utilized by a business to perform operations "over the cloud" as shown for the service provider system 102 and as described in relation to FIG. 8.

The service provider system 102 includes a digital content search system 108 that is representative of functionality to support a search of digital content 110, which is illustrated as stored in a storage device 112. Digital content 110 is configurable in a variety of ways, examples of which include digital images, digital music, digital documents, applications, settings, digital media, digital movies, digital books, and so forth.

An entity (e.g., a "user"), for instance, interacts with a user interface output by a communication module 114 (e.g., browser, network-enabled application, etc.) at a client device 104 to specify a search query. The search query is then communicated via the network 106 to the digital content search system 108. The digital content search system 108 performs a search of the digital content 110 based on the search query and returns a search result, e.g., having representations of the digital content 110. Although the described example involves network communication, local search techniques are also contemplated, e.g., to perform a search for digital content locally at the client device 104 without involving network 106 communication.

As previously described, a goal of search is to correctly infer an intent behind a search query. One such example usable to infer intent is represented as a sequence search module 116. The sequence search module 116 is configured to leverage sequences of past interaction of an entity with the digital content 110 to infer additional information about the entity's intent regarding a current search query. In the illustrated example, a sequence including first, second, and third items 118, 120, 122 of digital content is illustrated that are a subject of interaction of an entity via the client device 104. Each of these items, for instance, was provided as part of a respective search result and selected by the entity, e.g., to obtain digital images from a stock digital image service. The first and second items 118, 120 are part of a first project in this example involving shoes and the third item 122 is part of a second unrelated project involving national flags, which is the Union Jack in this example.

Conventional search techniques that leverage a sequence of past interactions are "global" in that each of the interactions are taken into account as part of the sequence regardless of "where" these interactions occur, temporally, in the sequence. This is often the case because conventional techniques, such as self-attention models, are configured for use in scenarios other than search. In natural language processing, for instance, each word of the sequence is taken into account to support "flexible order" of the words, e.g., for language modeling and machine translation.

For search, on the other hand, experimentation undertaken as part of the development of the techniques described herein has shown that this often causes erroneous search results. For the illustrated example, a search query 124 of "US Flag" that leverages the sequences of the first, second, and third items 118, 120, 122 of digital content includes a fourth item 126 depicting a shoe having a U.S. flag due to the global influence of the first and second items 118, 120 that also depict shoes. This failure is caused by an inability of conventional global techniques to capture-short-term dynamics due to a lack of inductive local bias.

Accordingly, in the techniques described herein the sequence search module 116 includes a machine-learning module 128 having a self-attention mechanism 130 that incorporates local constraints 132. Self-attention is a mechanism used in machine learning to focus on portions of the sequence to manage and quantify interdependence of elements of the sequence on generating a desired output. In machine translation, for instance, this is performed to determine a relative importance of input words, which is used to assign weights for mapping of the words from one language to another.

Self-attention has also been used to capture long-term and short-term dynamics simultaneously within a sequence as a way to infer a likely user intent in search queries. In the previous example, the interactions describe selection of particular items (e.g., stock digital images) within search results as a way to infer a likely intent of an entity that originated the search queries to guide subsequent searches and search results from search queries received from that entity.

In practice, however, it has been determined through experimentation that conventional self-attention mechanisms, when employed as part of search, often fail to capture short-term dynamics accurately due to a lack of inductive local bias. For example, real-world sequential search techniques are often faced with limited amounts of data. This causes conventional sequential search techniques, and particularly those that employ self-attention mechanism, to overly focus on distant historical interactions (e.g., the first and second items 118, 120 involving "shoes"), resulting in a degradation in performance and accuracy.

To address this, the self-attention mechanism 130 of the machine-learning module 128 incorporates local constraints 132 to assign attention and weights to interactions based on recency of those interactions. As a result, the local constraints 132 address temporal considerations to capture short-term dynamics. In an implementation, this is performed by leveraging a multi-head self-attention module that also incorporates global self-attention and as such accurately models both short-term and long-term dynamics. Further discussion of these and other examples is included in the following sections and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Digital Content Search Using Locally Constrained Self Attention

Figure 2:
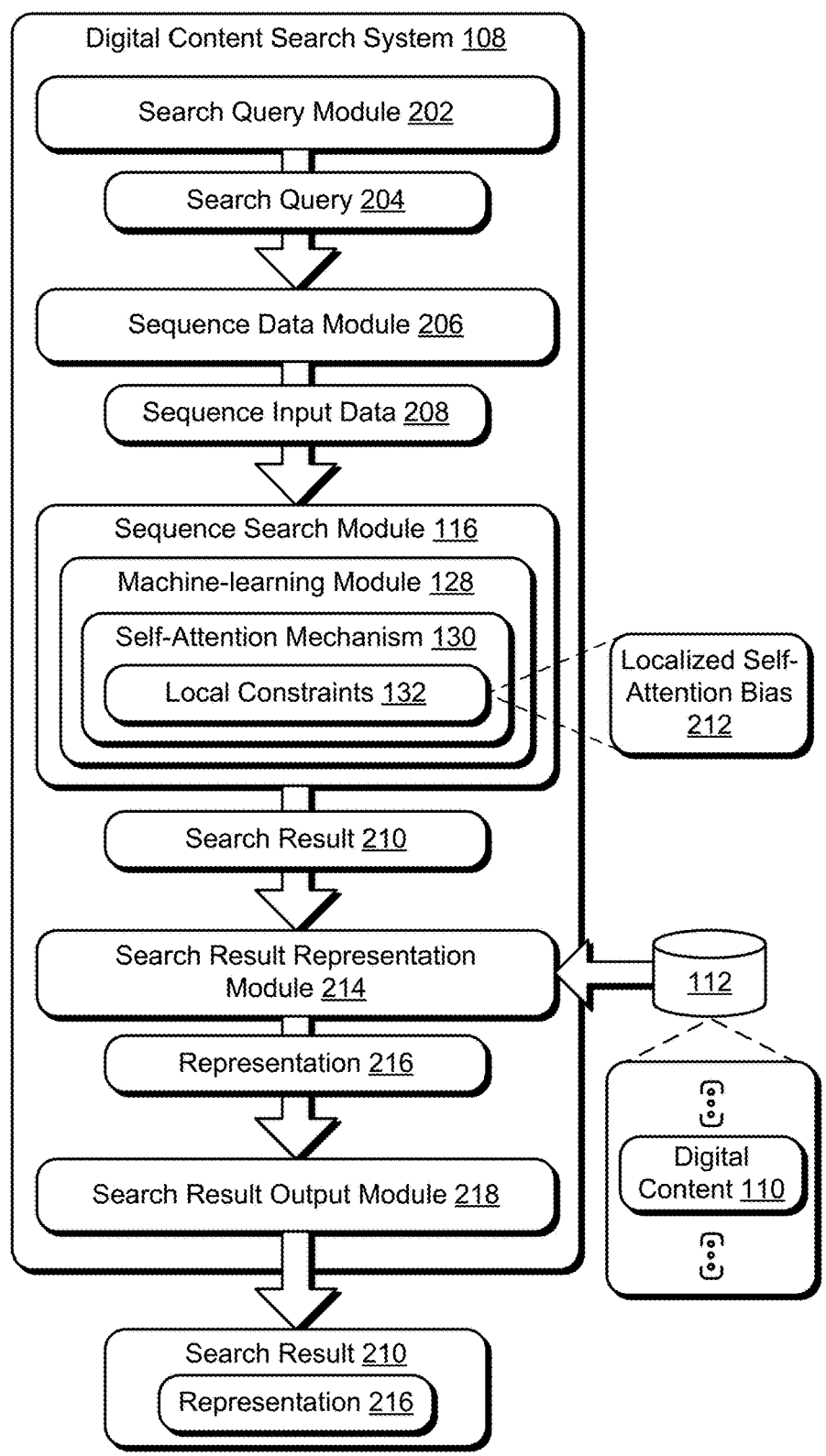
FIG. 2 depicts a system in an example implementation showing operation of a sequence search module of FIG. 1 in greater detail.
Figure 3:
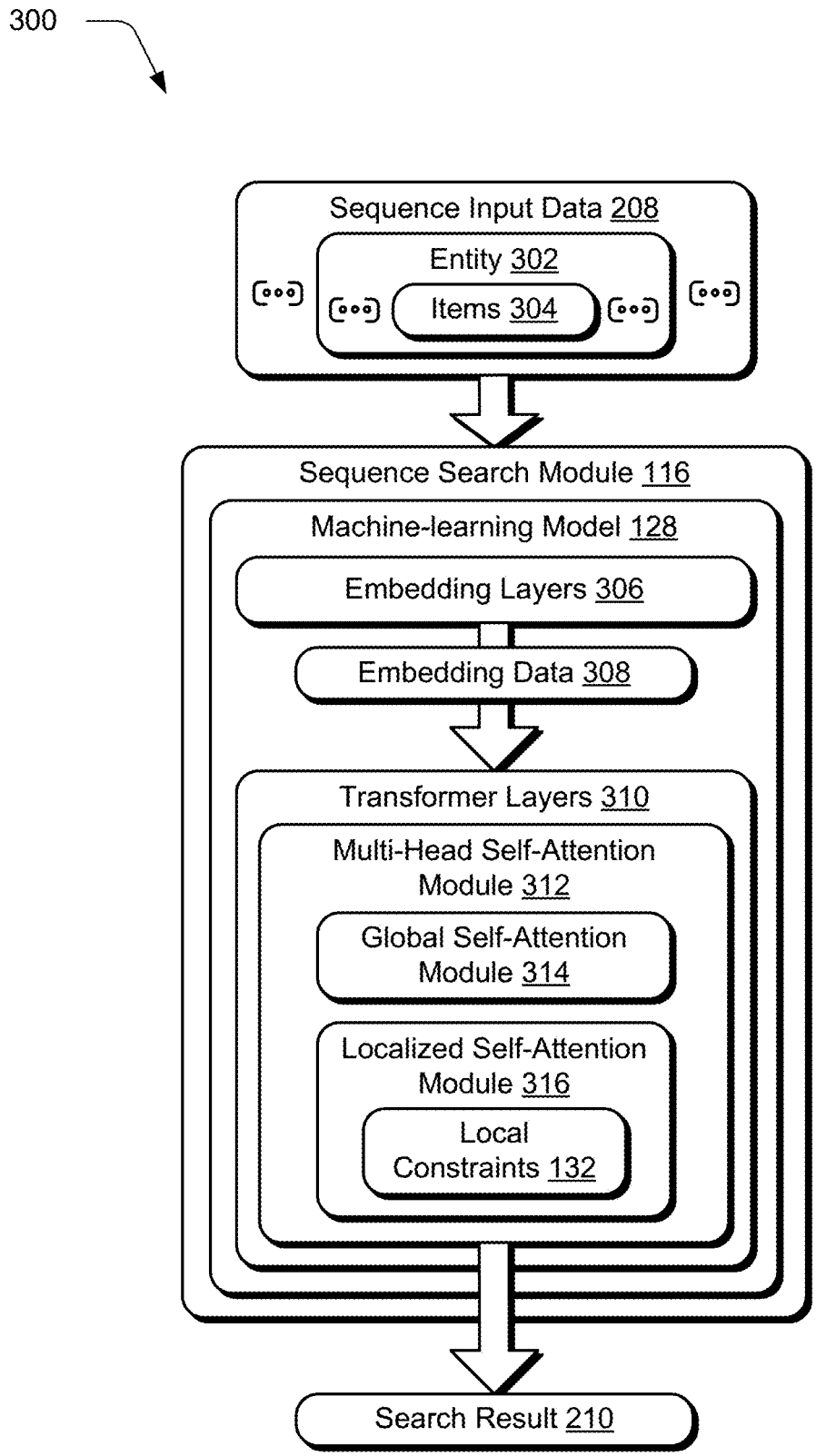
FIG. 3 depicts a system in an example implementation showing operation of a sequence search module of FIG. 2 as part of transformer layers in a multi-head self-attention module.
Figure 4:
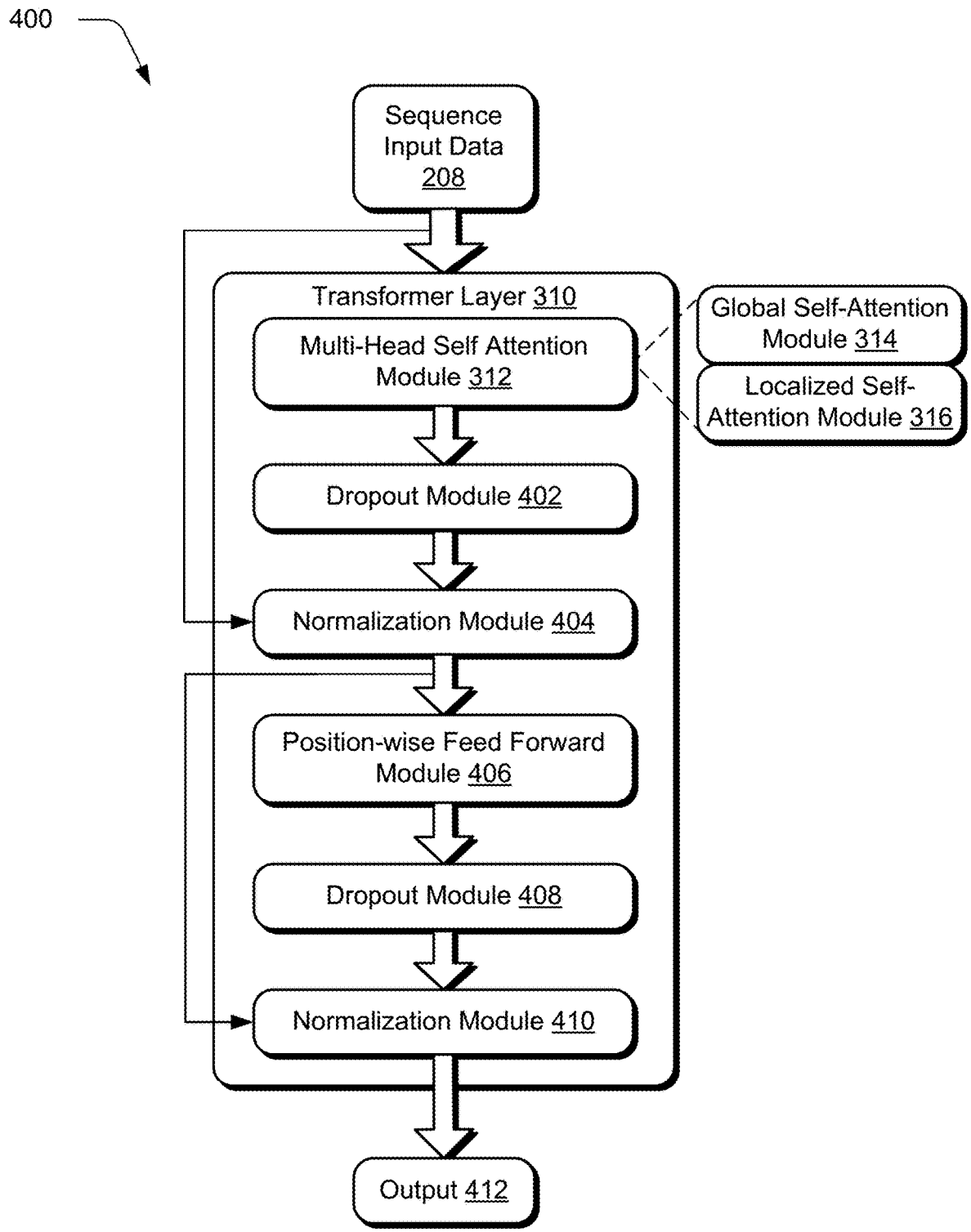
FIG. 4 depicts an example of a transformer layer of FIG. 3 in greater detail.
Figure 5:
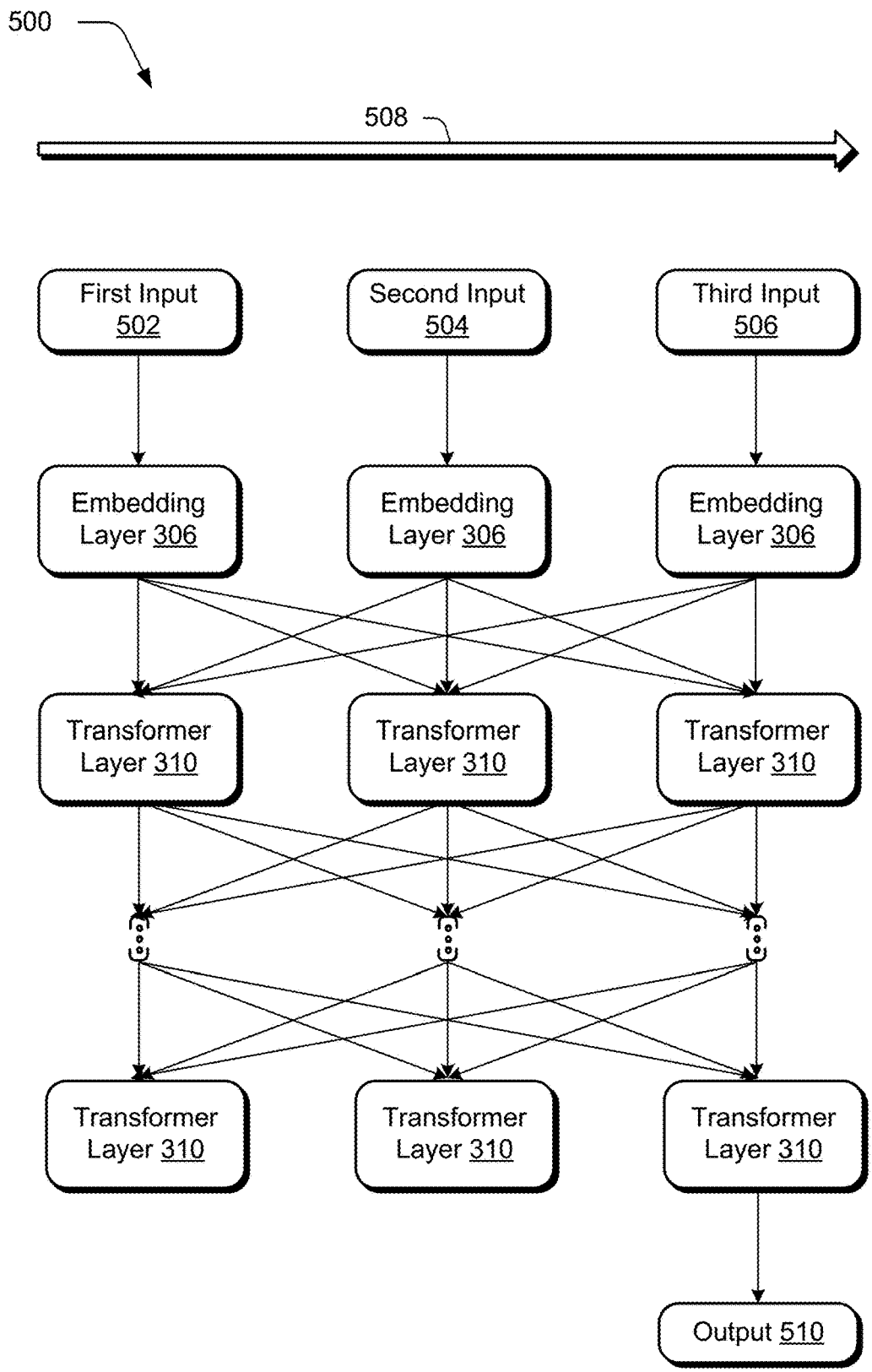
FIG. 5 depicts an example of a bidirectional configuration of transformer layers of FIG. 4.
Figure 6:
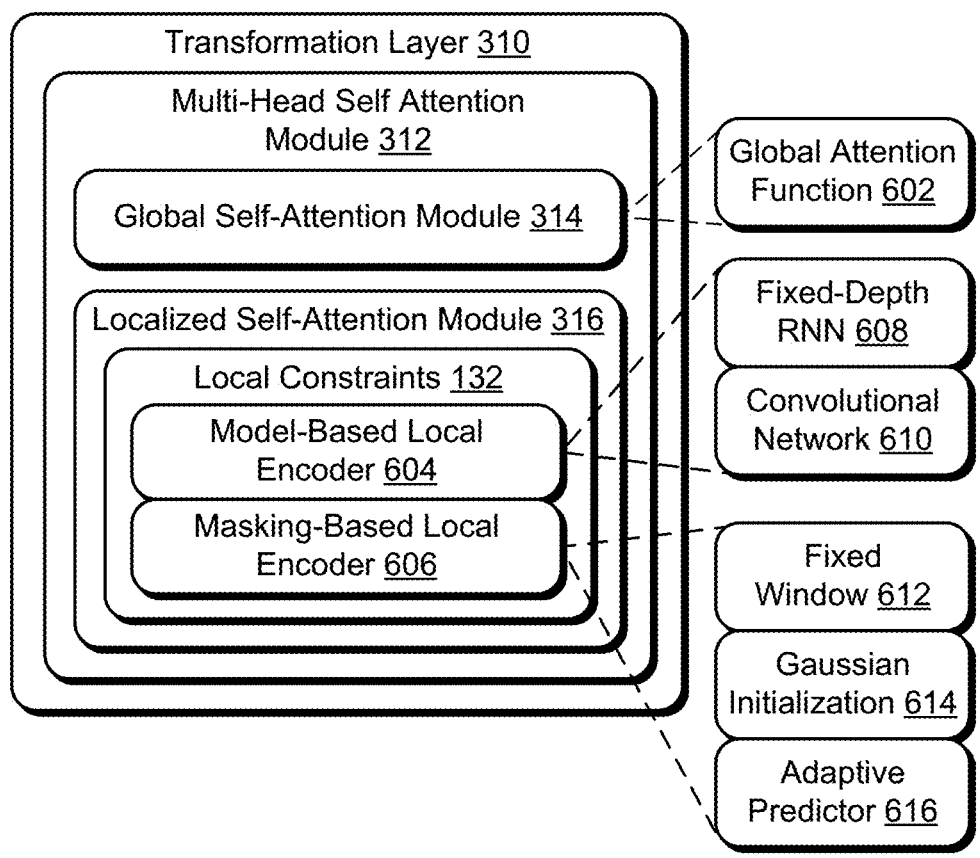
FIG. 6 depicts an example of configurations of model-based and masking-based local encoders as implementing local constraints of a localized self-attention bias.
Figure 7:
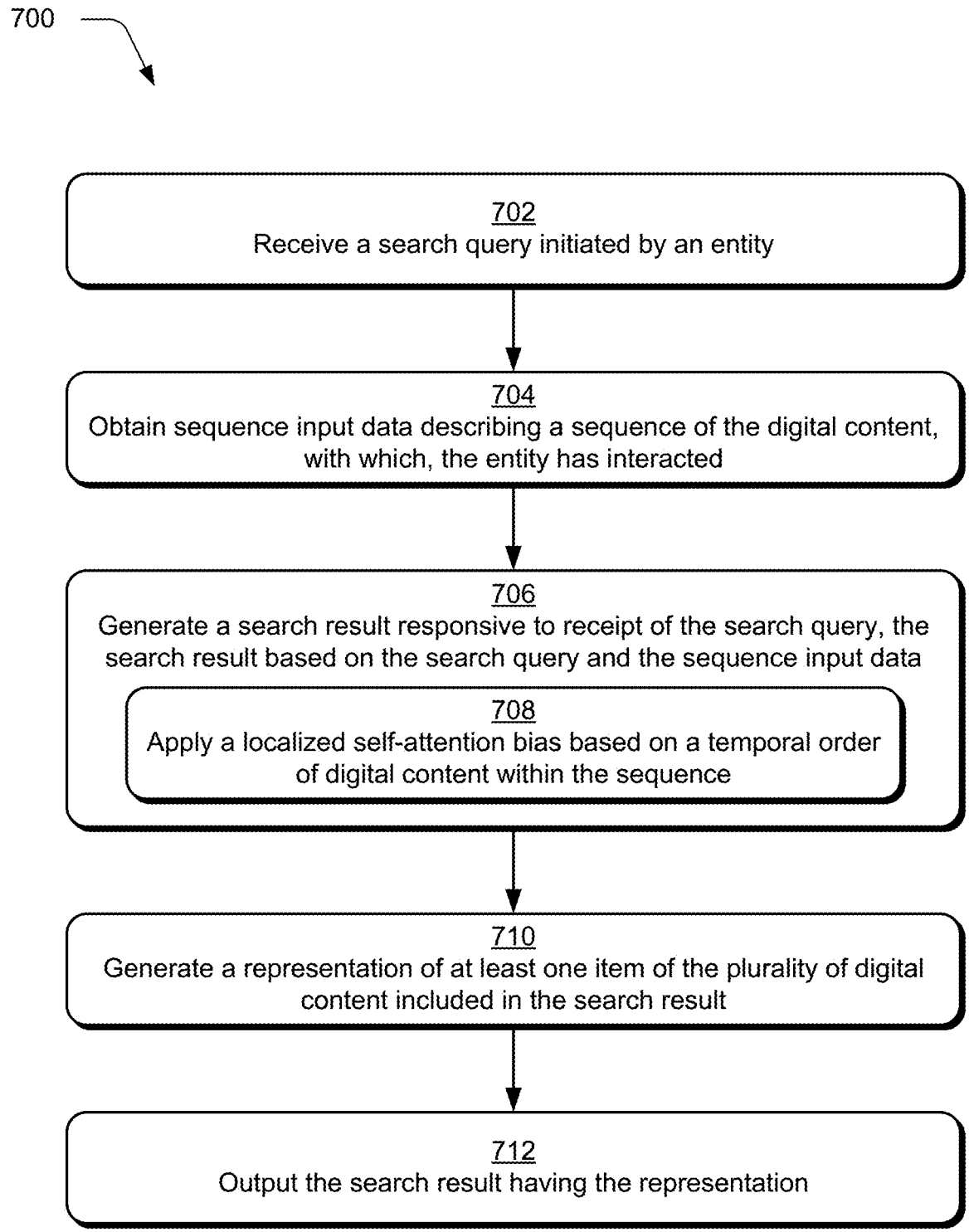
FIG. 7 is a flow diagram depicting a procedure in an example implementation of digital content search using locally constrained self-attention.

FIG. 2 depicts a system 200 in an example implementation showing operation of the sequence search module 116 of FIG. 1 in greater detail. FIG. 3 depicts a system 300 in an example implementation showing operation of the sequence search module 116 as part of transformer layers in a multi-head self-attention module. FIG. 4 depicts an example 400 of a transformer layer of FIG. 3 in greater detail. FIG. 5 depicts an example 500 of a bidirectional configuration of transformer layers of FIG. 4. FIG. 6 depicts an example 600 of configurations of model-based and masking-based local encoders as implementing local constraints of a localized self-attention bias. FIG. 7 is a procedure 700 in an example implementation of digital content search using locally constrained self-attention.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-7.

To begin in this example, a search query module 202 receives a search query 204 from an entity to initiate a search of a plurality of digital content 110 (block 702). The search query 204 is configurable in a variety of ways to initiate a search of a variety of types of digital content. The search query 204, for instance, is configurable as text to support a search of the digital content 110 as part of a keyword search, natural language processing and understanding, and so forth. In another instance, the search query 204 includes other types of data, such as positional information, digital images, digital audio, and so forth. As previously described, the search query 204 is receivable by the search query module 202 via the network 106, locally by the device itself, and so forth.

The search query 204 is passed from the search query module 202 to a sequence data module 206. The sequence data module 206 is configured to obtain sequence input data 208. The sequence input data 208 describes a sequence of the digital content, with which, the entity has interacted (block 704). The sequence data module 206, for instance, monitors interaction of an entity with previous search results, such as selections of particular items from the search results. This is used to generate the sequence input data 208 to describe particular items or actions that are previously undertaken by the entity. In a stock digital image example, the sequence input data 208 describes stock digital images selected for use from search results. The sequence input data 208 also describes a temporal order, in which, the digital images are obtained and may specify respective times, e.g., through use of timestamps. Other examples of sequence input data 208 are also contemplated that describe any sequence of actions and/or items (e.g., digital content) associated with the entity or another entity.

The search query 204 and the sequence input data 208 are then received as an input by a sequence search module 116. The sequence search module 116 is configured to generate a search result 210 based on this input data (block 706). To do so, a machine-learning module 128 employs a self-attention mechanism 130 in this example. Self-attention mechanisms 130 are employed as part of machine learning to identify which items of a sequence are relevant to achieving a goal, which in this instance is to correspond to an intent of an entity that originated a search query in identifying particular items of digital content 110 of interest.

Conventional self-attention mechanisms are "global" in that an entirety of a sequence described by the sequence input data 208 is used and does not take into account, directly, ordering or temporal considerations of items within the sequence. This is because conventional attention mechanisms are developed for tasks other than search, e.g., for natural language processing, translation, and others. As such, experiments and real-world examples involving conventional global attention mechanisms have exhibited a lack of accuracy due to an inability to capture short-term dynamics.

In the techniques and system described herein, however, the self-attention mechanism 130 is configured to apply a localized self-attention bias 212 through local constraints 132 based on a temporal order of digital content within the sequence (block 708) described by the sequence input data 208. The local constraints 132, for instance, are based on recency of the interactions with the digital content in the sequence. This is performed to give a greater weight to an item of digital content occurring more recent in the sequence than an item of digital content occurring later in the sequence. The localized self-attention bias 212 is implemented by the digital content search system 108 in a variety of ways, further discussion of which is described in relation to FIGS. 3 and 6.

The search result 210, once generated, is used as a basis by a search result representation module 214 to generate a representation 216 of digital content 110 referenced by the search result 210 (block 710). The search result 210 having the representation 216 is then output by a search result output module 218 (block 712). In a stock digital image scenario, for instance, the representation 216 is configured as a thumbnail depicting the stock digital image, includes a watermark, and is selectable to initiate a purchase or other technique to obtain the actual item of digital content 110. Other examples are also contemplated for other types of digital content, including cover art for digital music, a frame of a digital video, cover of a digital book, and so forth.

The sequence search module 116 is configurable in a variety of ways to incorporate local constraints 132 as part of the machine-learning module 128. FIG. 3 depicts an example in which the machine-learning module 128 is configured as a transformer. As before, the sequence input data 208 describes correlations between entities 302 and items 304, with which, the entities 302 have interacted, e.g., digital content 110.

The machine-learning module 128 includes embedding layers 306 implemented to generate embedding data 308 that is then processed by transformer layers 310 to generate the search result 210. The machine-learning module 128 in this example implements a transformer, which is a type of machine-learning model that employs an attention mechanism to weight significance of each of the items in the sequence for generating an output, e.g., the search result 210. Transformers are not configured, conventionally, to process the items 304 in order but rather provides context for any position in the sequence. Thus, conventional transformers are considered "global" in that the sequence as a whole is processed, simultaneously, to infer in parallel meaning of each item in the sequence on generating the output. As such, global attention mechanisms employ the state at any preview stage of the sequence, which are then weighted to provide relevant information, regardless of how recent each stage is generated.

In the illustrated example of FIG. 3, the transformer of the machine-learning module 128 includes a multi-head self-attention module 312. A multi-head attention configuration employs a plurality of different attention heads, each defining a respective technique of a plurality of techniques usable to define relevancy of respective items toward achieving the output. Each of these outputs are then weighted and used to arrive at a final output. Conventional multi-head self-attention modules employ global self-attention techniques as previously described, functionality of which is represented by a global-self-attention module 314.

The multi-head self-attention module 312 of FIG. 3 also incorporates a localized self-attention module 316 to incorporate local constraints 132. The local constraints 132 implement a localized self-attention bias 212 into the multi-head self-attention module 312. In this way, the localized self-attention module 316 improves accuracy of the multi-head self-attention module 312 to capture short-term dynamics along with long-term dynamics captured by the global-self-attention module 314.

FIG. 4 depicts the transformer layer 310 of FIG. 3 in greater detail. The transformer layer 310 receives the sequence input data 208 as previously described. The multi-head self-attention module 312 includes a global-self-attention module 314 and a localized self-attention module 316 as described above. The global-self-attention module 314 employs attention mechanism capture dependencies of pairs of items in the sequence without regard to distance between the pairs in the sequence. The localized self-attention module 316, on the other hand, employs local constraints 132 to give greater weight to recent interactions with respective items in the sequence.

Attention heads of the global-self-attention module 314 and the localized self-attention module 316 are linearly projected in respective subspaces and attention functions applied in parallel to produce output representations, which are concatenated and once again projected and combined. A dropout module 402 is employed to reduce overfitting for use as part of training with normalization performed by a normalization module 404.

A position-wise feed forward module 406 is then employed to support nonlinearity and interactions between different dimensions by processing outputs of the multi-head self-attention module 312 separately at each position. A dropout module 408 is also employed for use as part of training with normalization performed by a normalization module 410 to generate a final output 412.

The transformer layers 310 are configurable as part of a variety of machine-learning module 128 configurations. In an example of FIG. 5, the embedding layer 306 and transformer layers 310 are configured as part of a bidirectional model. At each transformer layer 310, representations are revised at each position by exchanging information across each of the positions at a previous transformer layer 310 in parallel for the first, second, and third inputs 502, 504, 506 originated over successive points in time 508 to generate an output 510. An example of a bidirectional model is described by Xusong Chen, Dong Liu, Chenyi Lei, Rui Li, Zheng-Jun Zha, and Zhiwei Xiong. 2019. BERT4SessRec: Content-Based Video Relevance Prediction with Bidirectional Encoder Representations from Transformer. *In Proceedings of the 27th ACM International Conference on Multimedia.* 2597-2601, which is hereby incorporated by reference in its entirety. Therefore, instead of passing information forward set-by-step as performed in unidirectional models, dependencies are captured at any distance within a globally receptive field with local constraints implemented by localized self-attention module 316 within the transformer layer 310. Use of unidirectional models is also contemplated without departing from the spirit and scope thereof.

FIG. 6 depicts an example of operation of the localized self-attention module 316 in greater detail. Multi-head self-attention module 312 includes a global-self-attention module 314 that implements a global attention function 602 as described above to capture dependences between items in the sequence, regardless of distance. The localized self-attention module 316, on the other hand, implements local constraints 132 for a localized self-attention bias 212.

The localized self-attention module 316 is configurable in a variety of ways as part of machine learning to implement the localized self-attention bias 212. Examples of this include a model-based local encoder 604 and a masking-based local encoder 606. The localized self-attention module 316 incorporates local constraints 132 into self-attention mechanisms. To do so, the multi-head self-attention module 312 concatenates output value vector from "M" different attention heads, which include "$M_l$" local encoders and "$M_g$" global encoders, formally represented as:

$$\tilde{V}_i = [\tilde{V}_{i,l}^{(1)}; \ldots ; \tilde{V}_{i,l}^{(Ml)}; \tilde{V}_{i,g}^{(1)}; \ldots ; \tilde{V}_{i,g}^{(Mg)}] W_O$$

where $$\tilde{V}_{i,l}^{(ml)} (\tilde{V}_{i,g}^{(mg)})$$

is an output value vector from the local and global encoders. For the model-based local encoder 604, a value of $$\tilde{V}_{i,l}^{(ml)}$$

is generated using neural-network operators with inductive local bias.

In a first example of a model-based local encoder 604, a fixed-depth recurrent neural network (RNN) 608 is employed, that is effective at short-term sequence modeling. The fixed-depth RNN 608 module is implemented as a local encoder as follows:

$$\tilde{V}_{i,l}^{(m_l)} = g(V_{i,l}^{(m_l)}, \underbrace{g(V_{i-1,l}^{(m_l)}, \ldots)}_{\text{recurrent depth } s}),$$

where "g" is the recurrent neural unit, e.g., a gated recurrent unit (GRU) such as "GRU4Rec." In this example, a GRU is utilized with a fixed and small depth "s" to simply computation and focus on short-term dynamics.

In a second example of a model-based local encoder 604, a convolutional network 610 is employed to model neighborhood dynamics. The convolution-based encoder for $$\tilde{V}_{i,l}^{(m_l)}$$

is defined as $$\tilde{V}_{i,l}^{(m_l)} = [c_1; \ldots ; c_{d/M}], \; c_j = act(V_{[i]_s, l}^{(m_l)} \odot W^{(j)})$$

where "⊙" denotes an inner product operator, and $$V_{[i]_s, l}^{(m_l)} \in \mathbb{R}^{s \times d/M}$$

denotes a local "[i−(s−1)/2, . . . , i+(s−1)/2]" rows (size "s" is an odd number) in $$V_l^{(m_l)} \in \mathbb{R}^{N \times d/M}$$

The following expression:

$$W^{(j)} \in \mathbb{R}^{s \times d/M}$$

denotes the "j-th" convolutional kernel and "act" is an activation function to introduce non-linearity, e.g., ReLU. Compared to other convolutional network used to capture point-level and union-level item similarities, this convolutional network 610 is adopted as a local operator to enhance short-term user dynamics modeling.

The masking-based local encoder 606 operates by "masking" portions of the sequence by introducing locality-aware masking to enhance an ability to capture short-term dynamics in an attention function, "$f_{att}$." The attention function "$f_{att}$" is defined by relevance logit "$w_{ij}$" with position "i," "j" and fed into a softmax layer for normalization, i.e.:

$$f_{att,l}(Q_i \to K_j) = \frac{\exp(w_{ij}) \cdot \sigma_{ij}}{\sum_{k=1}^{N} \exp(w_{ik}) \cdot \sigma_{ik}}$$

where masking score "$\sigma_{ij} \equiv 1$" for global self-attention. In the masking-based local encoder 606, the ability to capture short-term dynamics is enhanced by changing the masking score "$\sigma_{ij}$" with different strategies, examples of which are described as follows.

For a fixed window 612 strategy, distant tokens are deactivated, where "$\sigma_{ij}$" is defined as:

$$\sigma_{ij} = \mathbb{I}(|i-j| \leq s)$$

where "$\mathbb{I}$" is an indicator function. As a result, the attention map is masked by a fixed-length window to deactivate the dependency on distant (e.g., distance>s) tokens.

In some instances, the fixed window 612 strategy defines "hard" and "static" scores, that can be too rigid. Therefore, a Gaussian initialization 614 strategy may also be introduced to achieve "trainable" masking scores with good initialization to introduce a locality prior into the encoder. The masking operation "$\exp(w_{ij} \cdot \sigma_{ij})$" in the above equation, for instance, can be rewritten as "$\exp(w_{ij} \cdot \ln \sigma_{ij})$." The unbounded adjustable weight "$p_{i-j} = \ln \sigma_{ij}$" is learned, where "i–j" means that the different distance is mapped to a trainable weight "$p_{i-j}$."

Weight initialization is performed in this example following a Gaussian-like function, such as:

$$p_{i-j}^0 = a \exp(-(i-j)^2/b)$$

where local concentration exists in the neighborhood. Here "a" and "b" control a shape of initialized weights and changing weight initialization does not guarantee an explicit local "fixed window" exists after training. However, the initialization bias encourages the model to capture local patterns from an improved starting point, e.g., as opposed to uniform initialization, and is adjustable during training. To further encourage trainable weights to capture locality from data, positional embeddings are removed for local encoder vectors such that the positional embedding are incorporated solely into global encoder key and query vectors.

The above gaussian initialization 614 strategy adjusts soft scores but does not encode additional information, such as an entity identifier "u." Therefore, the Gaussian initialization 614 strategy is extendable to incorporate a parameterized adaptive predictor 616 strategy to predict different masking scores, i.e.:

$$p_{i-j}^{(u)} = \text{pred}(V_{i,l}^{(m_l)} + V_{j,l}^{(m_l)} + v_u + b_{i-j})$$

where entity information:

$$v_u \in \mathbb{R}^{1 \times d}$$

distance embedding:

$$b_{i-j} \in \mathbb{R}^{1 \times d}$$

and current value vectors:

$$V_{i,l}^{(m_l)} \text{ and } V_{j,l}^{(m_l)}$$

Representations "$v_u$" are constructed without extra embeddings for the entity. Positional embeddings are removed for local encoder vectors to encourage the machine-learning module 128 to learn locality form the data, and "pred" is a two-layer MLP model configured to learn flexible masking scores with entity, distance, and current token information.

As described above, conventional global self-attention does not capture short-term user dynamics without localized self-attention bias 212. Accordingly, techniques and system are described above that implement a framework to introduce local inductive bias as part of self-attention. In the examples above, functionality of self-attention networks is expanded using five examples of local encoders to enhance short term dynamics modeling. Other inductive biases are also contemplated for implementing local constraints 132 in self-attentive recommenders without departing from the sprit and scope of the techniques described herein.

Example System and Device

Figure 8:
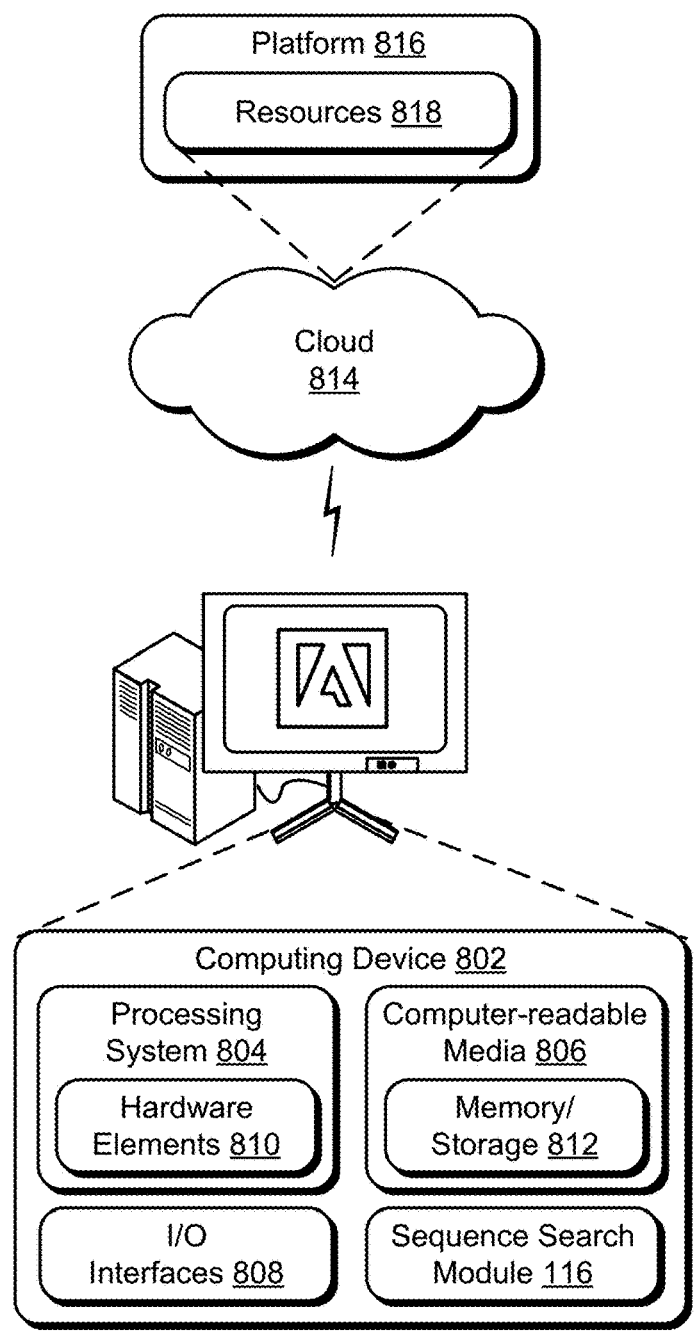
FIG. 8 illustrates an example system including various components of an example device that can be implemented as any type of computing device as described and/or utilize with reference to FIGS. 1-7 to implement embodiments of the techniques described herein.

FIG. 8 illustrates an example system generally at 800 that includes an example computing device 802 that is representative of one or more computing systems and/or devices that implement the various techniques described herein. This is illustrated through inclusion of the sequence search module 116. The computing device 802 is configurable, for example, as a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that is configurable as processors, functional blocks, and so forth. This includes implementation in hardware as an application specific integrated circuit or other logic device formed using one or more semiconductors. The hardware elements 810 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 806 is illustrated as including memory/storage 812. The memory/storage 812 represents memory/storage capacity associated with one or more computer-readable media. The memory/storage 812 includes volatile media (such as random access memory (RAM)) and/or nonvolatile media (such as read only memory (ROM), Flash memory, optical disks, magnetic disks, and so forth). The memory/storage 812 includes fixed media (e.g., RAM, ROM, a fixed hard drive, and so on) as well as removable media (e.g., Flash memory, a removable hard drive, an optical disc, and so forth). The computer-readable media 806 is configurable in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 802. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 802, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 810. The computing device 802 is configured to implement particular instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing system 804. The instructions and/or functions are executable/operable by one or more articles of manufacture (for example, one or more computing devices 802 and/or processing systems 804) to implement techniques, modules, and examples described herein.

The techniques described herein are supported by various configurations of the computing device 802 and are not limited to the specific examples of the techniques described herein. This functionality is also implementable all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 include applications and/or data that can be utilized while computer processing is executed on servers that are remote from the computing device 802. Resources 818 can also include services provided over the Internet and/or through a subscriber network, such as a cellular or Wi-Fi network.

The platform 816 abstracts resources and functions to connect the computing device 802 with other computing devices. The platform 816 also serves to abstract scaling of resources to provide a corresponding level of scale to encountered demand for the resources 818 that are implemented via the platform 816. Accordingly, in an interconnected device embodiment, implementation of functionality described herein is distributable throughout the system 800. For example, the functionality is implementable in part on the computing device 802 as well as via the platform 816 that abstracts the functionality of the cloud 814.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising:
   a search query module implemented in hardware of a computing device, the search query module receiving a search query from an entity to search a plurality of digital content;
   a sequence data module implemented in hardware of the computing device, the sequence data module obtaining sequence input data describing a sequence of the digital content, with which, the entity has interacted, the sequence of the digital content including a first item from the plurality of digital content with which the entity interacted and a second item from the plurality of digital content with which the entity interacted, the first item being from a first search performed by the entity and the second item being from a second search performed by the entity;
   a sequence search module implemented in hardware of the computing device, the sequence search module generating a search result based on the search query and the sequence input data, the sequence search module including a machine-learning module having a localized self-attention module specifying a localized self-attention bias based on a temporal order of digital content within the sequence, the localized self-attention module including a masking-based local encoder implementing the localized self-attention bias, the self-attention bias assigning greater weight to the first item relative to the second item based upon the first item occurring more recently in the sequence than the second item;
   a search result representation module implemented in hardware of the computing device, the search result representation module generating a representation of the first item included in the search result, the search result representation module using the greater weight assigned to the first item as a basis for including the representation of the first item in the search result; and
   a search result output module implemented in hardware of the computing device, the search result output module outputting the search result having the representation.

2. The system as described in claim 1, wherein the masking-based local encoder implements a fixed window.

3. The system as described in claim 1, wherein the masking-based local encoder implements Gaussian Initialization.

4. The system as described in claim 1, wherein the masking-based local encoder implements an adaptive predictor.

5. The system as described in claim 1, wherein the machine-learning module includes a multi-head self-attention model including a global self-attention module and the localized self-attention module.

6. The system as described in claim 5, wherein the global self-attention module is configured to process the sequence regardless of location of respective said digital content within the sequence.

7. A method implemented by a computing device, the method comprising:
   receiving, by the computing device, a search query initiated by an entity;
   obtaining, by the computing device, sequence input data describing a sequence of digital content, with which, the entity has interacted, the sequence of digital content including a first item of digital content with which the entity interacted and a second item of digital content with which the entity interacted, the first item being from a first search performed by the entity and the second item being from a second search performed by the entity;
   generating, by the computing device, a search result responsive to receipt of the search query, the generating based on the search query and the sequence input data using machine learning, the search result generated using a transformer layer including
      a localized self-attention module processing the sequence, at least in part, based on location of the respective said digital content within the sequence, the localized self-attention module including a masking-based local encoder implementing localized self-attention bias, the self-attention bias assigning greater weight to the first item of digital content relative to the second item of digital content based upon the first item on digital content occurring more recently in the sequence than the second item of digital content; and
   outputting, by the computing device, the search result, the search result including a representation of the first item of digital content based upon the greater weight assigned to the first item of digital content.

8. The method as described in claim 7, wherein the masking-based local encoder implements a fixed window.

9. The method as described in claim 7, wherein the masking-based local encoder implements Gaussian Initialization.

10. The method as described in claim 7, wherein the masking-based local encoder implements an adaptive predictor.

11. A computing device having a processor and a computer readable medium comprising:
- means for receiving a search query from an entity to search a plurality of digital content;
- means for obtaining sequence input data describing a sequence of the digital content, with which, the entity has interacted, the sequence of digital content including a first item from the plurality of digital content with which the entity interacted and a second item from the plurality of digital content with which the entity interacted, the first item being from a first search performed by the entity and the second item being from a second search performed by the entity;
- means for generating a search result based on the search query and the sequence input data, the generating means including a machine-learning module having a localized self-attention module including a masking-based local encoder enforcing a localized self-attention bias based on recency of the digital content in a temporal order of the sequence, the self-attention bias assigning greater weight to the first item relative to the second item based upon the first item occurring more recently in the sequence than the second item; and
- means for outputting the search result, the search result providing a representation of the first item based upon the greater weight assigned to the first item.

12. The computing device as described in claim 11, wherein the machine-learning module includes a multi-head self-attention model including a global self-attention module and the localized self-attention module.

13. The computing device as described in claim 12, wherein the global self-attention module is configured to process the sequence regardless of location of respective said digital content within the sequence.

14. The system as described in claim 1, wherein the search query is configured as text as part of a keyword search or a natural language search.

15. The method as described in claim 7, wherein the search query is configured as text as part of a keyword search or a natural language search.

16. The method as described in claim 7, wherein the localized self-attention module is part of a multi-head self-attention model that also includes a global self-attention module.

17. The method as described in claim 16, wherein the global self-attention module is configured to process the sequence regardless of location of respective said digital content within the sequence.

18. The computing device as described in claim 11, wherein the masking-based local encoder implements a fixed window.

19. The computing device as described in claim 11, wherein the masking-based local encoder implements Gaussian Initialization.

20. The computing device as described in claim 11, wherein the masking-based local encoder implements an adaptive predictor.

* * * * *